Patented Nov. 30, 1948

2,454,915

UNITED STATES PATENT OFFICE 2,454,915

ISOLATION OF LIPOVITELLENIN FROM EGG YOLK

Harry L. Fevold and Adele Lausten Dimick, Berkeley, Calif., assignors to United States of America as represented by the Secretary of Agriculture No Drawing. Application May 21, 1947, Serial No. 749,606

4 Claims. (Cl. 99—14)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to a new lipoprotein which has been named lipovitellenin [Fevold et al., Archives of Biochemistry, vol. 11, pp. 1 to 7 (1946)].

An object of this invention is to provide processes for isolating lipovitellenin from egg yolk.

Another object of this invention is to provide solutions of lipovitellenin.

Further objects and advantages will be obvious from the disclosure herein.

We have found that lipovitellenin can be isolated from egg yolk by the following method:

1. Egg yolk and water are mixed together and the mixture centrifuged. The supernatant liquid material which contains the desired product is retained. The proportion of egg yolk and water is not critical. Generally, 1 volume of egg yolk to 1 to 3 volumes of water gives good results. Our preferred proportion is 1 volume of egg yolk to 2 volumes of water.

2. The liquid material from the centrifuging step is mixed with ether and the mixture allowed to stand. Three layers are formed—an upper layer containing ether and fatty materials, an intermediate layer containing the crude lipovitellenin, and a bottom layer containing water, water-soluble proteins, mineral salts, etc. The layer of crude lipovitellenin in the form of a yellow, somewhat gelatinous mass, is easily separated from the other phases. The proportion of ether to supernatant liquid is not critical. Generally, at least one-half volume of ether to each volume of liquid is necessary. The proportion of ether may be increased to any desired extent above this proportion. It is generally preferred to employ equal volumes of ether and supernatant liquid.

In order to purify the crude product obtained in the extraction process, it is generally washed with ether then with water and dissolved in 10% salt solution. This liquid is subjected to dialysis and the purified material can then be dried by lyophilization, i. e., the material is frozen and then subjected to a vacuum while in the frozen state until all the water is removed.

The crude lipovitellenin can also be purified by repeated extraction with ether and then dried over phosphorus pentoxide in vacuum.

The following example discloses particular steps, conditions, and reagents within the scope of this invention, but it is to be understood that this example is given only by way of illustration and not limitation.

EXAMPLE

Six liters of distilled water was homogenized with 2850 ml. of egg yolk. The material was then centrifuged (bowl speed about 40,000 R. P. M.) and the solid material separating out was discarded. The supernatant liquid was mixed with an equal volume of ethyl ether and allowed to stand overnight. The liquid separated into three distinct phases, an upper layer containing fatty material dissolved in ether, an intermediate layer of crude lipovitellenin, and a bottom layer containing water and water soluble proteins. The upper ether layer and the lower aqueous layers were removed and discarded. The intermediate layer of crude solid lipovitellenin was removed and extracted several times with ethyl ether until the ether extract was colorless. Finally this solid material was washed with distilled water and then dissolved in 10% sodium chloride solution. The solution was placed in a bag made of regenerated cellulose and placed in a tank filled with running water. After allowing the dialysis to proceed for sufficient length of time to remove the salt and other dialyzable materials, the contents of the bag was subjected to lyophilization, i. e., drying from the frozen state under reduced pressure. A yield of about 200 grams of solid, dry lipovitellenin was obtained.

If it is desired to store the product for a considerable period it may be dissolved in aqueous salt solution, preferably of 10% concentration, saturated with ether.

Lipovitellenin is a lipoprotein, that is, it is a combination of a phospholipid and a protein which acts as a chemical compound. The following table shows the chemical composition of different samples of the material prepared isolated to our process:

TABLE I

Composition of lipovitellenin

| Prep. No. | Alcohol extractable phospholipid percent | Nitrogen, percent | Phosphorus, percent | Sulphur, percent |
|---|---|---|---|---|
| 1 | 41.5 | 9.98 | 1.74 | |
| 2 | 41.0 | 10.0 | 1.71 | |
| 3 | 40.0 | 9.9 | | |
| 4 | 36.6 | 10.03 | | |
| 5 | 37.3 | | 1.71 | 0.61 |
| 6 | 38.0 | 9.90 | 1.68 | 0.60 |
| 7 | 39.0 | | 1.74 | 0.59 |
| 8 | 38.5 | 9.90 | 1.70 | 0.62 |

Analyses were also conducted on the phospholipid and protein (vitellenin) fractions separated by alcohol extraction of the lipovitellenin. The separation was accomplished by repeated extraction (6 or 7 times) with cold alcohol (about 40 ml./gram of sample). The alcohol soluble material was dried and represents the phospholipid portion of the product. Content of this portion is shown in Table I. The phospholipid portion was found to be soluble in ether while the alcohol insoluble fraction was insoluble in organic solvents. The following tables disclose chemical analyses of the separate fractions:

TABLE II

Composition of phospholipid fraction

| Prep. No. | Nitrogen, percent | Phosphorus, percent |
|---|---|---|
| 1 | 1.80 | 3.76 |
| 2 | 1.65 | 3.51 |
| 3 | 1.76 | 3.62 |
| 4 | | |
| 5 | 1.82 | 3.71 |
| 6 | 1.79 | 3.77 |
| 7 | 1.75 | 3.69 |

TABLE III

Composition of protein (vitellenin) fraction

| Prep. No. | Nitrogen, per cent | Phosphorus, per cent | Sulphur, per cent |
|---|---|---|---|
| 1 | 15.4 | 0.29 | |
| 2 | 15.4 | 0.29 | |
| 3 | 15.6 | 0.31 | |
| 4 | 15.7 | 0.29 | 0.92 |
| 5 | 15.5 | 0.24 | 0.86 |
| 6 | 15.6 | 0.30 | 0.91 |
| 7 | 15.4 | 0.31 | 0.94 |
| 8 | 15.6 | 0.29 | 0.90 |

In these tables (I, II, and III), the particular samples of product were made as follows:

In preparations 1, 2, and 3, the lipovitellenin was isolated as described in the example herein.

In preparations 4, 5, 6, and 7, the lipovitellenin was isolated as described in the example herein with the added precaution that the dried material was extracted with ether before weighing and before analysis.

In preparation 8, the crude lipovitellenin from the ether extraction step was repeatedly extracted with ether until fairly dry (i. e. free of water) and then dried in a vacuum desiccator over phosphorus pentoxide.

Lipovitellenin is a yellowish, solid material which dissolves in 10% sodium chloride solution to form a turbid solution. Saturation of the solution with ether causes the disappearance of the turbidity and formation of a clear golden-yellow solution. Solution of lipovitellenin in aqueous salt solutions saturated with ether provides an advantageous method of storing this material and prevents its decomposition. Lipovitellenin is decomposed by treatment with acetone. It is soluble in alkali and can be precipitated by addition of an acid in apparently unchanged condition.

The product of this invention, lipovitellenin, is not to be confused with the known lipoprotein, lipovitellin. The differences between these two lipoproteins can be demonstrated as follows:

Lipovitellenin contains about 10% nitrogen and 1.7% phosphorus. Lipovitellin contains about 13% nitrogen and 1.5 phosphorus.

Lipovitellenin contains about 39% phospholipid while lipovitellin contains about 17% phospholipid.

The protein fraction of lipovitellenin contains about 0.3% phosphorus while the corresponding fraction of lipovitellin contains about 1% phosphorus.

Lipovitellenin emulsifies in 10% salt solution to form a turbid solution which can be cleared only by saturation with ether while lipovitellin will dissolve in 10% salt solution to form a clear solution.

The product of this invention, lipovitellenin, is useful for special feeding purposes in human nutrition such as in infant feeding.

Having thus described our invention, we claim:

1. A process for isolating lipovitellenin from egg yolk comprising mixing egg yolk with water, centrifuging the mixture, discarding the separated solids adding ether to the supernatant liquid, allowing the liquid to stand to form three layers, namely, an upper layer containing fatty material dissolved in ether, an intermediate layer of crude lipovitellenin, and a lower layer containing water and water soluble proteins and removing the intermediate layer of lipovitellenin.

2. A process for isolating lipovitellenin from egg yolk comprising mixing egg yolk with 1 to 3 volumes of water, centrifuging the mixture, discarding the separated solids adding at least one-half volume of ether to the supernatant liquid, allowing the liquid to stand to form three layers, namely, an upper layer containing fatty material dissolved in ether, an intermediate layer of crude lipovitellenin, and a lower layer containing water and water soluble proteins, and removing the intermediate layer of lipovitellenin.

3. A process for isolating lipovitellenin from egg yolk comprising mixing egg yolk with about 2 volumes of water, centrifuging the mixture, discarding the separated solids, adding about an equal volume of ether to the supernatant liquid, allowing the liquid to stand to form three layers, namely, an upper layer containing fatty material dissolved in ether, an intermediate layer of crude lipovitellenin, and a lower layer containing water and water soluble proteins, and removing the intermediate layer of lipovitellenin.

4. A process according to claim 3, wherein the lipovitellenin layer is extracted with ether, washed with water, subjected to dialysis in salt solution and dried by lyophilization.

HARRY L. FEVOLD.
ADELE LAUSTEN DIMICK.

REFERENCES CITED

The following references are of record in the file of this patent:

UNITED STATES PATENTS

| Number | Name | Date |
|---|---|---|
| 2,243,860 | Freilich et al. | June 3, 1941 |

OTHER REFERENCES

J. Biol. Chem., vol. 142 (1942), page 491–493, by Chargoff.

Arch Biochemistry 8, page 415 to 419 (1945), by Fevold et al.